(12) United States Patent
Jones et al.

(10) Patent No.: US 7,090,165 B2
(45) Date of Patent: Aug. 15, 2006

(54) AEROENGINE NACELLE

(75) Inventors: Emlyn Jones, Derby (GB); Richard G Stretton, Loughborough (GB)

(73) Assignee: Rolls-Royce plc, London (GB)

( * ) Notice: Subject to any disclaimer, the term of this patent is extended or adjusted under 35 U.S.C. 154(b) by 153 days.

(21) Appl. No.: 10/697,945

(22) Filed: Oct. 31, 2003

(65) Prior Publication Data

US 2004/0238687 A1 Dec. 2, 2004

(30) Foreign Application Priority Data

Jun. 2, 2003 (GB) ................... 0312490.6
Jul. 7, 2003 (GB) ................... 0315800.3

(51) Int. Cl.
*B64B 1/28* (2006.01)

(52) U.S. Cl. ..................... 244/53 R; 244/54

(58) Field of Classification Search ............... 244/1 N, 244/53 R, 53 B, 54; 137/15.1; 239/265
See application file for complete search history.

(56) References Cited

U.S. PATENT DOCUMENTS

| | | | | | |
|---|---|---|---|---|---|
| 4,585,189 | A | * | 4/1986 | Buxton | 244/54 |
| 5,157,915 | A | * | 10/1992 | Bart | 60/797 |
| 6,227,485 | B1 | * | 5/2001 | Porte | 244/54 |
| 6,334,730 | B1 | * | 1/2002 | Porte | 403/104 |

* cited by examiner

*Primary Examiner*—Peter M. Poon
*Assistant Examiner*—Timothy D. Collins
(74) *Attorney, Agent, or Firm*—W. Warren Taltavull; Manelli Denison & Selter PLLC

(57) ABSTRACT

A nacelle (55) for a gas turbine engine (10), the engine (10) comprising accessories (34) mounted to a fan casing (28) and a core engine (9), the nacelle (55) substantially surrounds the engine (10) and comprises an intake (12) and a thrust reverser unit (31). The thrust reverser unit (31) is formed by two generally C-shaped portions (31a, 31b). The thrust reverser unit (31) is openable to provide access to the accessories (34) and the core engine (9). The nacelle (55) further comprises a fan containment casing (33) that is integral with the intake (12).

9 Claims, 5 Drawing Sheets

AEROENGINE NACELLE

FIELD OF THE INVENTION

The present invention relates to a nacelle for a gas turbine engine and in particular a nacelle configuration comprising an openable thrust reverser unit to provide improved access to accessories mounted on a fan casing and a core engine.

BACKGROUND OF THE INVENTION

A conventional nacelle for a turbofan gas turbine engine comprises three major components: an intake, fan cowl doors and a thrust reverser unit. These turbofan engines also incorporate a fan containment system attached to an engine fan casing. The fan cowl doors are generally C-shaped that are each opened by a power opening system and hold-open rods for access to fan casing mounted accessories. The thrust reverser unit also comprises two generally C-shaped doors that are each opened by a further power opening system and hold-open rods for access to the core engine and other core mounted engine accessories.

This conventional arrangement is disadvantaged in that there are two independent power opening system and hold-open rods for the fan cowl doors and thrust reverser doors. Furthermore, the prior art nacelle comprises a joint between each section which leads to an undesirable disturbance in airflow over the nacelle inner and outer surfaces with resultant aerodynamic drag losses. This arrangement also requires substantial fire insulation material around the large fan casing chamber inward of the fan cowl doors. Thus the conventional arrangement is heavy and costly to manufacture and is disadvantaged by requiring two sets of doors to be opened for access to the engine.

SUMMARY OF THE INVENTION

Therefore it is an object of the present invention to provide a nacelle arrangement that reduces the number of openable doors, reduces weight of the assembly and reduces aerodynamic drag. These are accomplished by reducing the number of nacelle components to two, with primarily the fan cowl doors being integrated partially into the intake and substantially into the thrust reverser unit. This arrangement also integrates the fan containment system into the nacelle intake removing the need for a bolted flange joint and reducing the size of the fan casing chamber fire zone. As the fan case accessory fire zone is reduced in size less fire extinguishing equipment, ventilation requirements and fire protection treatment is required.

The reduced number of steps or gaps between nacelle components, especially in the external nacelle surface reduces aerodynamic drag. Access to the fan case mounted accessories and core engine is simplified by provision of a single power opening system and hold open rods to the extended thrust reverser unit. The intake of the present invention extends further rearwards and provides an extended length for natural airflow and subsequent aerodynamic drag reduction. By integrating the fan containment casing into the intake, there is no bolted flanged joint forward of the fan system enabling provision for improved acoustic panels thus reducing engine-generated noise.

Accordingly the present invention seeks to provide a nacelle for a gas turbine engine, the engine comprising accessories mounted to a fan casing and a core engine, the nacelle substantially surrounds the engine and comprises an intake and a thrust reverser unit, the thrust reverser unit is formed by two generally C-shaped and openable portions characterised in that the thrust reverser unit is openable to provide access to the accessories and the core engine.

Preferably, the nacelle comprises a fan containment casing, the fan containment casing is integral with the intake.

Preferably, an acoustic panel extends between a downstream edge of the fan containment casing and a leading edge of the intake, thus reducing engine-generated noise.

Preferably, the fan containment casing is disposed outside a fire zone of the nacelle.

BRIEF DESCRIPTION OF THE DRAWINGS

The present invention will be more fully described by way of example with reference to the accompanying drawings in which.

DETAILED DESCRIPTION OF THE INVENTION

Figure 1:
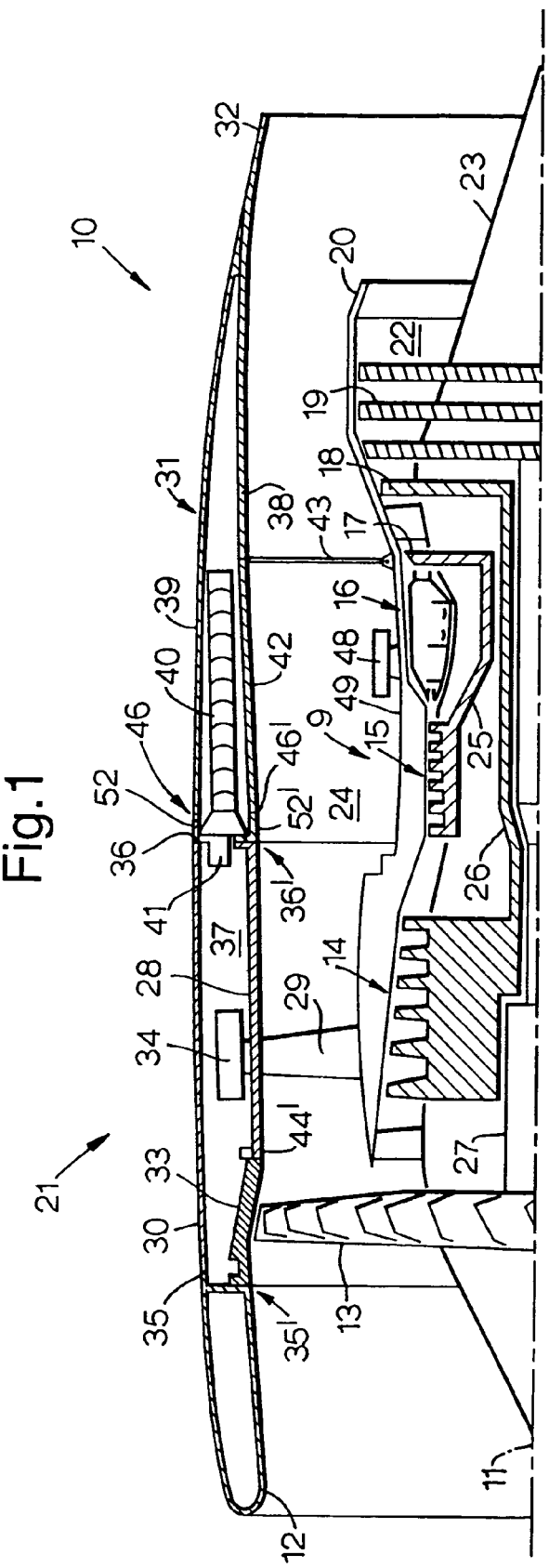
FIG. 1 is a schematic section of part of a prior art nacelle surrounding a conventional fan gas turbine engine.
Figure 2:
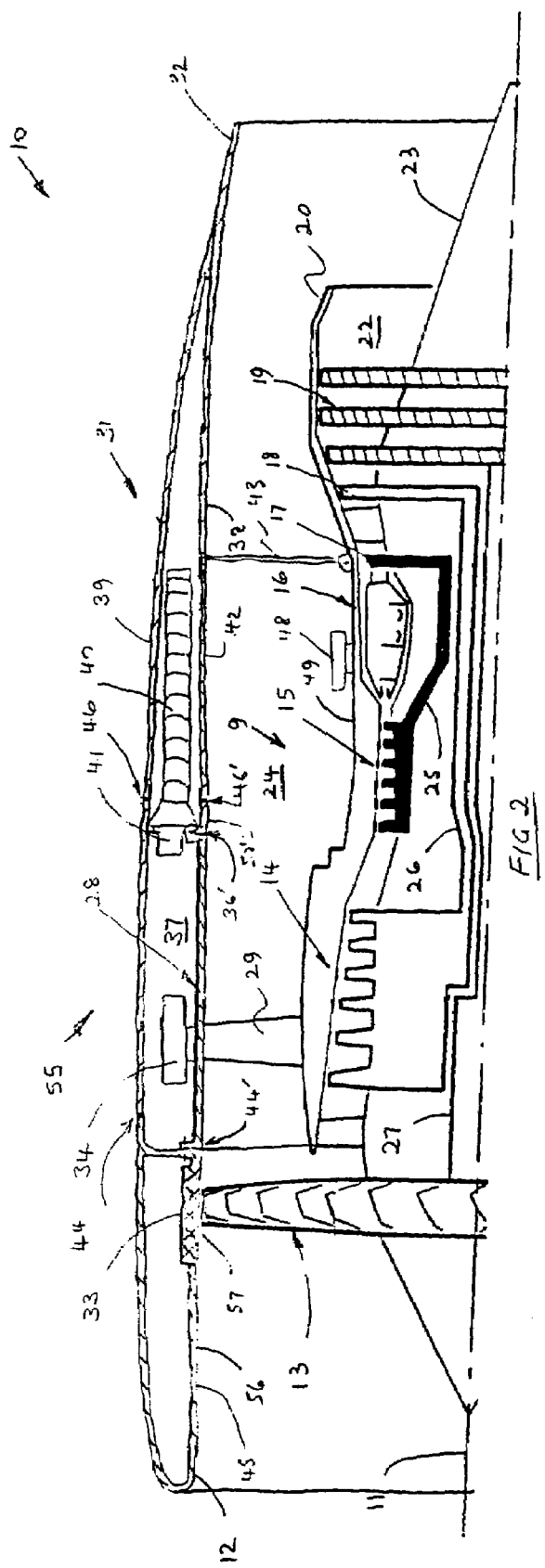
FIG. 2 is a schematic section of part of a nacelle, in accordance with a first embodiment of the present invention, surrounding a conventional fan gas turbine engine.

With reference to FIGS. 1 and 2, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core nozzle 20. A core duct 22 is partly defined radially inwardly by a core plug 23 and radially outwardly by the core nozzle 20.

The gas turbine engine 10 works in the conventional manner so that air entering the intake 11 is accelerated by the fan 13 to produce two air flows: a first air flow into the intermediate pressure compressor 14 and a second air flow which passes through a bypass duct 24 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts 25, 26, 27.

A fan casing 28 circumferentially surrounds the fan 13 and an array of outlet guide vanes 29 and comprises a fan containment casing 33. The fan containment casing 33 surrounds the fan 13 and is attached to the fan casing 28 at a bolted flange joint 44'. The fan casing 28 is supported by the annular array of outlet guide vanes 29. The fan casing 28 is used as a mount for some engine accessories 34 as known in the art.

Referring to FIG. 1, a conventional nacelle 21 generally surrounds the engine 10 and comprises the intake 12, fan cowl doors 30, a thrust reverser unit 31 and a bypass exhaust nozzle 32. It is necessary to access the accessories 34 for maintenance and so fan cowl doors 30 are provided. Two generally C-shaped fan cowl doors 30 are rotatably mounted to a pylon suspended from a wing of an associated aircraft and each are openable via a power opening system and hold open rods as known in the art. The fan cowl doors 30 are located via V-shaped groove joints 35, 36 to the intake 12 and thrust reverser unit 31 respectively. The fan cowl doors 30 and the fan casing 28 define a chamber 37 in which the engine accessories 34 are housed. The chamber 37 is a fire zone and must therefore be adequately sealed against fire escaping therefrom. The chamber 37 is provided with fire protection material that lines the chamber 37, fire extinguishing equipment and suitable ventilation requirements. Such fire precautions are well known in the art and an example of which is the Rolls-Royce Trent 700 Aeroengine.

Rearward of the fan cowl doors 30, and located via radially outer and inner V-shaped groove joints 36 and 36' to the downstream end of the fan casing 28, is the thrust reverser unit 31. The thrust reverser unit 31 comprises radially inner and outer walls 38, 39 and housed therebetween a cascade structure 40 and a drive mechanism 41 for operation of the thrust reverser unit in thrust reversing mode. The drive mechanism 41 is mounted to the axially short member 52, which is attached to the fan casing at joint 36' and to fan cowl doors at joint 36. The outer wall 39 joins the axially short member 52, 52' at joint 46 and the inner wall at joint 46'.

The thrust reverser unit 31 further comprises bypass duct blocker doors 42, rotatably mounted at their upstream end to the inner wall 38 and at their downstream end to a rotatably mounted link 43. The operation of the thrust reverser unit 31 is well known and briefly comprises the drive mechanism 41 driving the radially inner and outer walls 38, 39 rearward to expose the cascade structure 40 to the airflow through the bypass duct 24, which is blocked by the blocker doors 42 having been swung radially inwardly by the rearward movement and the rotatable links 43.

It is necessary to access the core 9 of the engine 10 to maintain other engine accessories 48 mounted on a core engine casing 49, the compressors 14, 15, turbines 16, 17, 18 and combustor equipment 16 and so the thrust reverser comprises two generally C-shaped portions that are rotatably mounted to a pylon suspended from a wing of an aircraft and are each openable via a power opening system and hold open rods as known in the art.

However, this conventional arrangement is disadvantaged in that there are two independent power-opening systems and sets of hold-open rods for the fan cowl doors 30 and thrust reverser unit doors 31. Furthermore, the prior art nacelle 21 comprises joints 35, 35' and 36, 36' between each nacelle section (12, 30, 31) and further joints 46, 46' that cause undesirable breakdown in airflow over the nacelle inner and outer surfaces and subsequent aerodynamic drag losses. This arrangement also requires substantial fire insulation material within the large fan casing chamber 37 inward of the fan cowl doors 30. Thus this conventional arrangement is also heavy and costly to manufacture and does not provide simple access for engine maintenance.

Figure 3:
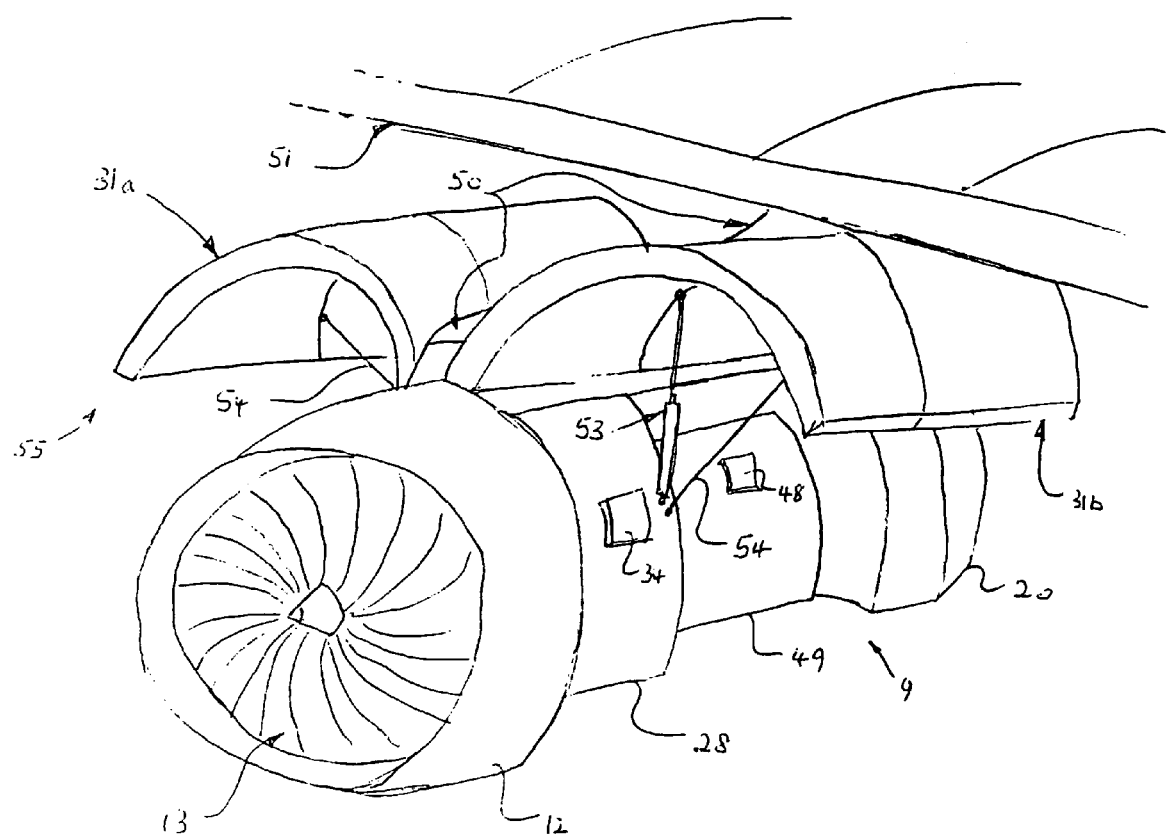
FIG. 3 is an isometric view of a nacelle mounted to a wing and in accordance with the present invention.

Referring now to FIGS. 2 and 3 where the engine 10 and its operation is substantially the same as described hereinbefore, a nacelle 55 in accordance with the present invention generally surrounds the engine 10 and comprises an intake 12 and a thrust reverser unit 31. The fan cowl doors 30 of the prior art nacelle 21 have been removed and are replaced mainly by the radially outer wall 39 being extended forwards, thereby surrounding the fan casing 28, to meet with the rearward part of the intake 12 at joint 44, 44'. The intake 12 comprises the fan containment casing 33 in an integral assembly. Therefore as shown in FIG. 2 the tip 57 of each fan blade of the fan 13 is substantially parallel with the engine centre-line 11 to permit the intake 12 to be assembled to the fan casing 28.

The thrust reverser 31 of the present invention comprises two generally C-shaped portions 31a, 31b that are rotatably mounted to a pylon 50 suspended from a wing 51 of an associated aircraft, and are each openable via a power opening system 53 and hold open rods 54 as known in the art. However briefly, the power opening system 53 is rotatably mounted to the fan casing 28 and provides a force to open each C-shaped portions 31a, 31b, while the hold open rods 54 are manually fitted to provide a rigid support. Access to the engine accessories 34 and core engine 9, which includes the core accessories 48, is therefore made simpler through this single set of thrust reverser C-shaped doors 31a, 31b. Each power opening system 53 is attached to each C-shaped portions 31a, 31b at its centre of gravity to avoid any twisting or distortion during opening. Alternatively, the power opening system 53 is rotatably mounted to an aircraft pylon structure.

It should be appreciated that the nacelle 55 arrangement of the present invention reduces the number of nacelle 55 components to two, with primarily the prior art fan cowl doors 30 being integrated partially into the intake 12 and mainly into the thrust reverser unit 31. This arrangement then integrates the fan containment system 33 into the intake 12 removing the joints 35, 35' and 36. Joint 36' remains in place between the radially inner wall 38 of the thrust reverser unit 31 and the rearward end of the fan casing 28. The joint 44, 44' is positioned rearward of the fan 13, which reduces the size of the fan casing chamber 37 fire zone. As this fan case accessory fire zone is reduced in size a reduced amount of fire extinguishing equipment, ventilation requirements and fire protection treatment is required making the nacelle assembly 55 lighter and cheaper than the prior art nacelle 21. Furthermore, reducing the number of joints reduces the number of steps or gaps between nacelle components, especially in the external nacelle surface which is beneficial in reducing aerodynamic drag and which allows an improved airflow to form over the radially inner and outer surfaces of the nacelle 55. It is a further advantage that each C-shaped portion 31a, 31b is stiffer than the conventional design thereby eliminating the need for internal stiffeners. The present invention also means that a reduced number of hinges and latches are required providing a further weight and cost advantage. Access to the fan case mounted accessories 34 and core engine 9 is simplified by provision of a single power opening system 53 and hold open rods 54 to open each C-shaped portion 31a, 31b of the thrust reverser unit 31. The intake 12 of the present invention extends further rearwards and provides an extended length for a smooth airflow to form and subsequent aerodynamic drag reduction. By integrating the fan containment casing 33 into the intake 12, there is no bolted flanged joint 35, 35' forward of the fan system 13. This enables substantially all of a radially inner surface 45 of the intake 12 to comprise acoustic panels 56 which extend between the downstream edge of the fan containment casing 33 and the leading edge of the intake 12, thus reducing engine-generated noise.

Figure 4:
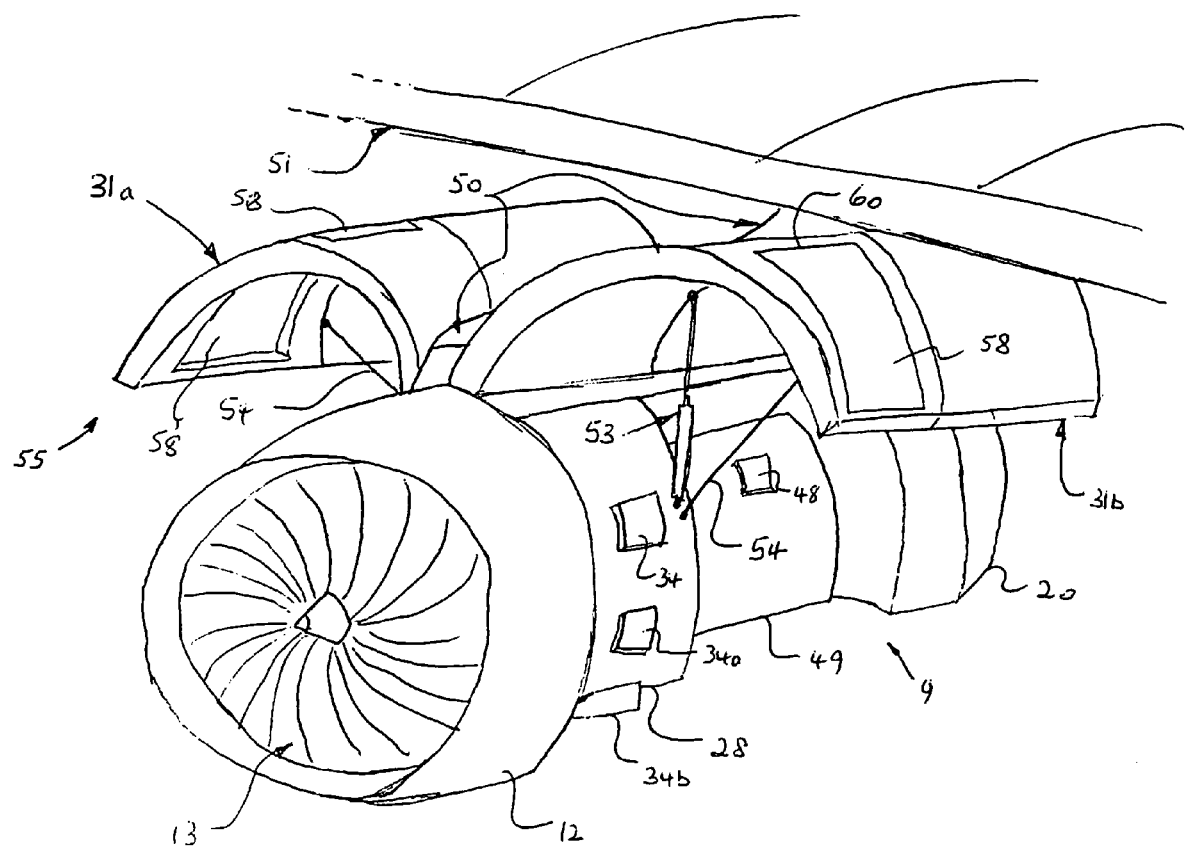
FIG. 4 is an isometric view of a nacelle mounted to a wing and in accordance with a second embodiment of the present invention.

Referring now to FIG. 4, a second embodiment of the present invention comprises each C-shaped portion 31*a*, 31*b* of the thrust reverser unit 31 having an openable access door 58. The access door 58 is openable independently of the each C-shaped portion 31*a*, 31*b* so that quick and easy access to engine accessories 34, 34*a*, 34*b* is possible without opening the entire C-shaped portion 31*a*, 31*b*. The engine accessories 34*a* and 34*b* are typically any or more from the group comprising a gearbox, an oil tank, an oil filter or an electronic engine controller. The access doors 58 are pivoatbly attached along join 60 to the C-shaped portions 31*a*, 31*b* and are openable only when the C-shaped portions 31*a*, 31*b* are closed. It is intended that the access doors 58 are lightweight and do not require powered operation such as the power opening system 53 of the first embodiment, but instead are manually openable and then secured using similar hold open rods 54. Although two access doors 58 are shown, one, three or four doors may be included, or numerous smaller access doors dedicated for access to particular accessories. It is preferable for there to be two access doors 58 which each extends between the bottom dead centre of the engine to the 3 and 9 O'clock positions respectively when looking at the front of the engine. With the hinge line 60 positioned near the horizontal centre line or in the lower quadrant of the access doors 58, the doors 58 will naturally hang open in a near vertical position allowing engine access with a requirement for minimal door support. The doors 58 will need to be lifted manually for latching as they do not hang unrestrained in a closed position, and avoid the possibility of despatch without the doors 58 being properly latched and secured. It is desirable, although not essential, to provide an additional safety catch on each door 58 (e.g. at the forward or leading edge) allowing each door 58 to be opened or closed independently by a single person.

Figure 5:
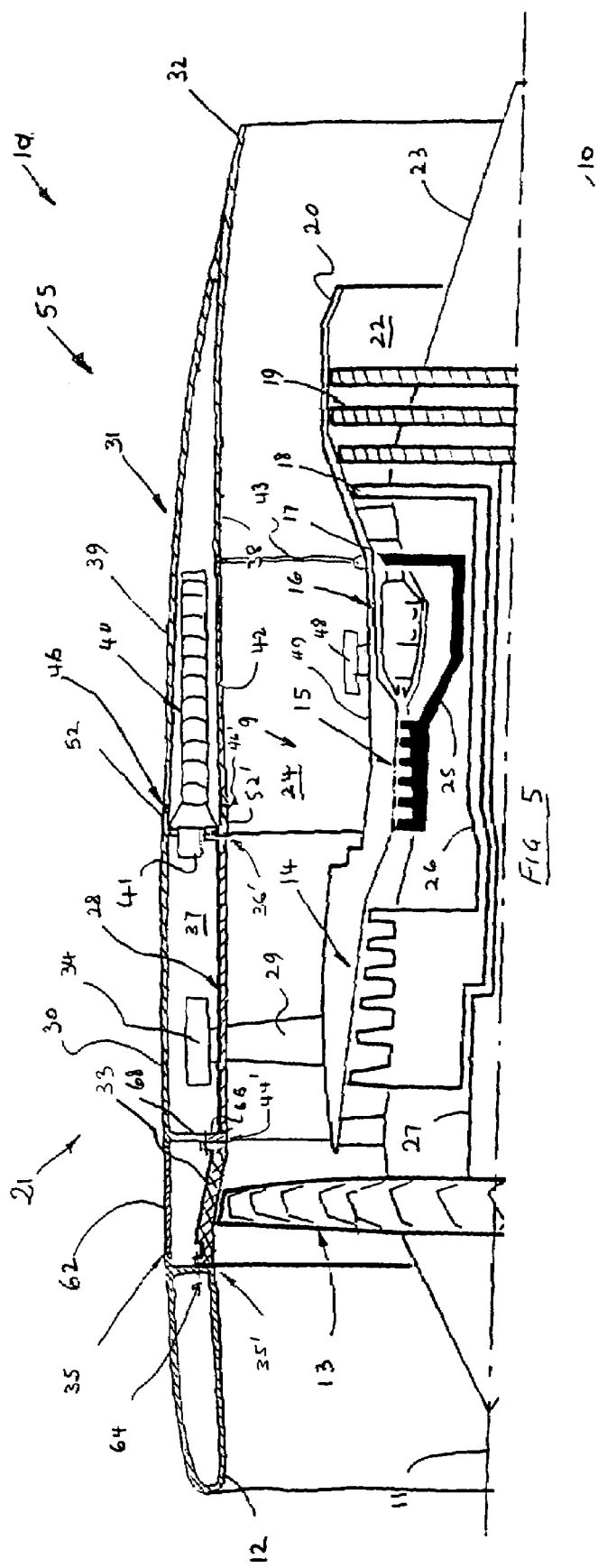
FIG. 5 is a schematic section of part of a nacelle, in accordance with a third embodiment of the present invention, surrounding a conventional fan gas turbine engine.

Referring to FIG. 5, where like parts to those shown in FIG. 1 are numbered the same, a third embodiment of the present invention comprises the nacelle 31 having a number of removable panels 62 circumferentially disposed radially outwardly of the fan containment casing 33. The panels 62 provide access to the fan containment casing 33 and bolted joints 64 and 66 that attach the fan containment casing 33 to the inlet 12 and remainder of the fan casing 28 respectively.

This third embodiment differs from that of FIG. 2 in that the fan containment casing 33 is bolted to the inlet 12 thereby allowing a rearward hade to the tips of the fan blades 13. The access panels 62 are not part of the thrust reverser unit 31 and therefore do not open with the thrust reverser unit 31.

It should be noted that chamber 37 extends radially outward of the fan containment casing 33 and that member 68 is one of an array of members 68 that support the outer wall of the nacelle.

This embodiment is advantageous as fan blade hade may be used which provides a performance improvement over the embodiment of FIG. 2. The advantages of the embodiment or FIG. 2 are also apparent for this embodiment.

It should be appreciated by one skilled in the art that other forms of thrust reverser unit are interchangeable with the cascade structure/blocker door style arrangement described herein, whilst remaining within the scope of the present invention. Other thrust reverser units include those described in and incorporated herein by reference to "The Jet Engine", Rolls-Royce Plc, 1986 pp 159–167, and those others as known in the art, such as pivoting door type thrust reversers.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A nacelle for a gas turbine engine, the engine comprising accessories mounted to a fan casing and a core engine, the nacelle substantially surrounding the engine and comprising an intake and a thrust reverser unit, the thrust reverser unit being formed by two generally C-shaped and openable portions and with the thrust reverser unit housed within at least one of said C-shaped portions and including a radially outer wall of at least one of said C-shaped portions and characterized in that at least one of said C-shaped portions is openable to provide access to the accessories and the core engine.

2. A nacelle as claimed in claim 1 wherein the nacelle comprises a fan containment casing, the fan containment casing is integral with the intake.

3. A nacelle as claimed in claim 2 wherein the intake comprises an acoustic panel that extends between a downstream edge of the fan containment casing and a leading edge of the intake, thus reducing engine-generated noise.

4. A nacelle as claimed in claim 2 wherein the fan containment casing is disposed outside a fire zone of the nacelle.

5. A nacelle as claimed in claim 2 wherein at least one access panel is provided radially outwardly of the fan containment casing to allow access thereto.

6. A nacelle as claimed in claim 1 wherein at least one access door is provided in the C-shaped portions radially outward of the fan casing to allow access thereto.

7. A nacelle as claimed in claim 6 wherein at least one access door is pivotably attached to the C-shaped portions and is manually openable only when the C-shaped portions are closed.

8. A nacelle as claimed in claim 6 wherein at least one access door is pivotally attached to the C-shaped portion, and the pivotal attachment is positioned near a horizontal line of the C-shaped portion such that the access door hangs open in a near vertical position allowing engine access.

9. A nacelle as claimed in claim 6 wherein at least one access door is pivotally attached to the C-shaped portion, and the pivotal attachment is positioned in a lower quadrant of the C-shaped portion such that the access door hangs open in a near vertical position allowing engine access.

* * * * *